(12) United States Patent
Malcolm et al.

(10) Patent No.: US 12,474,313 B2
(45) Date of Patent: Nov. 18, 2025

(54) SAMPLE COLLECTOR FOR PARTICULATE MATERIAL AND METHOD

(71) Applicants: Roger J. Malcolm, San Clemente, CA (US); Stuart Hersey, San Diego, CA (US)

(72) Inventors: Roger J. Malcolm, San Clemente, CA (US); Stuart Hersey, San Diego, CA (US)

( * ) Notice: Subject to any disclaimer, the term of this patent is extended or adjusted under 35 U.S.C. 154(b) by 0 days.

(21) Appl. No.: 18/662,761

(22) Filed: May 13, 2024

(65) Prior Publication Data
US 2024/0295535 A1   Sep. 5, 2024

Related U.S. Application Data

(63) Continuation of application No. 17/006,855, filed on Aug. 30, 2020, now Pat. No. 11,982,599.

(60) Provisional application No. 62/894,445, filed on Aug. 30, 2019.

(51) Int. Cl.
| | |
|---|---|
| *G01N 1/02* | (2006.01) |
| *G01N 1/12* | (2006.01) |
| *G01N 31/22* | (2006.01) |

(52) U.S. Cl.
CPC .............. *G01N 31/22* (2013.01); *G01N 1/02* (2013.01); *G01N 1/12* (2013.01); *G01N 2001/022* (2013.01)

(58) Field of Classification Search
CPC .... G01N 1/12; G01N 31/22; G01N 2001/022; G01N 1/08; G01N 2001/027; G01N 1/10; G01N 2001/1037; G01N 1/02; E02D 1/04

USPC ...... 73/863.81, 864, 864.01, 864.24, 864.44, 73/864.45, 864.51, 864.63, 864.74, 73/864.81; 436/161, 174; 422/68.1, 422/82.05, 501, 514, 521

See application file for complete search history.

(56) References Cited

U.S. PATENT DOCUMENTS

| | | | | |
|---|---|---|---|---|
| 5,400,666 A | * | 3/1995 | Song | G01N 35/1079 73/864.21 |
| 2004/0162523 A1 | * | 8/2004 | Conway | A61B 5/15074 604/164.08 |
| 2005/0014273 A1 | * | 1/2005 | Dahm | B01L 3/5635 436/45 |

FOREIGN PATENT DOCUMENTS

WO   2007/022373   *   8/2006

\* cited by examiner

*Primary Examiner* — Robert R Raevis
(74) *Attorney, Agent, or Firm* — Charmasson, Buchaca and Leach, LLP

(57) ABSTRACT

A sample collector for extracting a particulate material specimen from a container includes a needle for puncturing the container and capturing an amount of specimen inside a chamber in mechanical communication with the needle. A spring-loaded continuously and progressively retractable and extendable sheath protects the tip of the needle from inadvertent contact with a human user and encloses the puncture site on the container during collection. A preliminary screening test for illicit substances can be conducted on part of the collected specimen to determine whether the container should be confiscated. Part of the collected specimen can be preserved for later confirmatory testing.

17 Claims, 7 Drawing Sheets

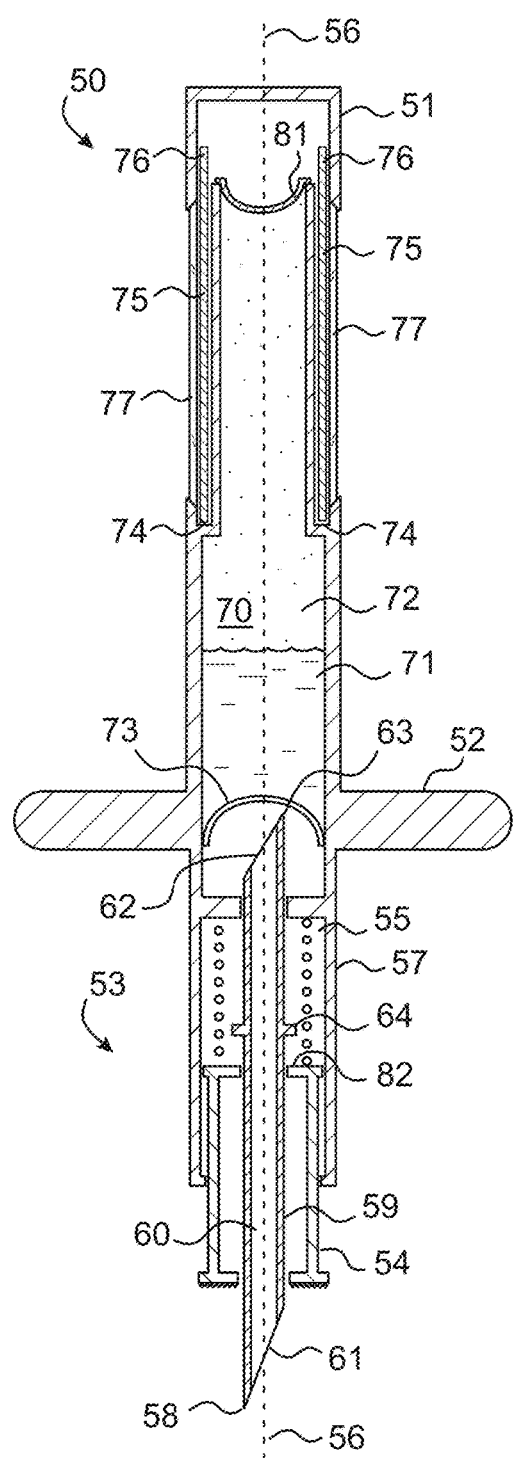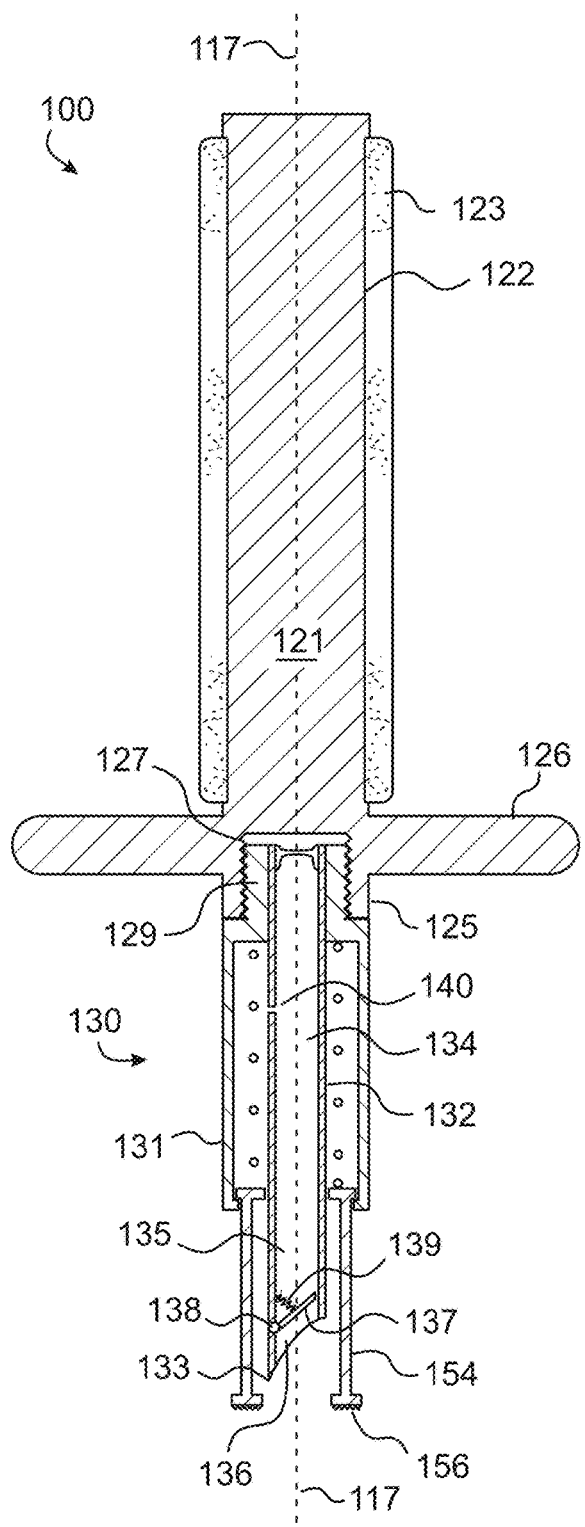
FIG. 9
FIG. 10

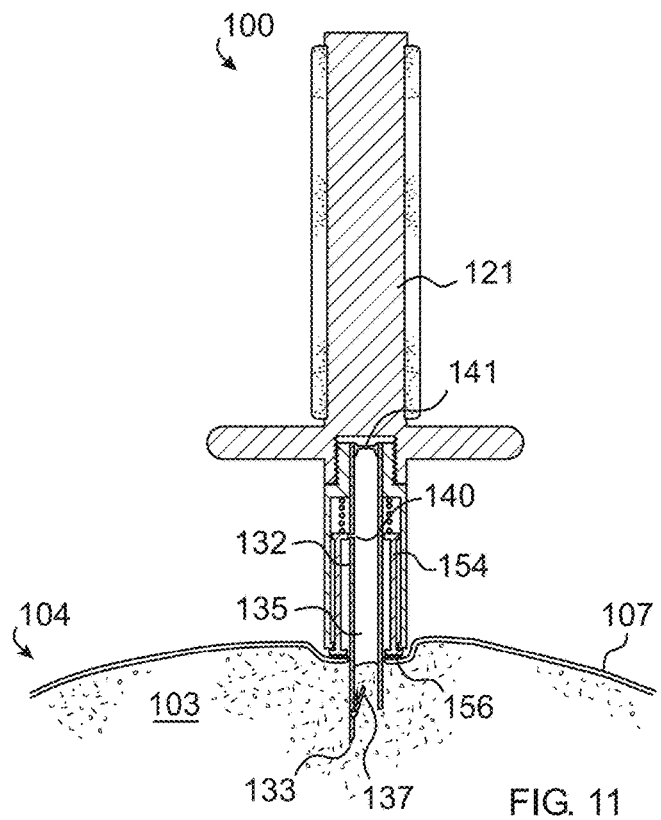
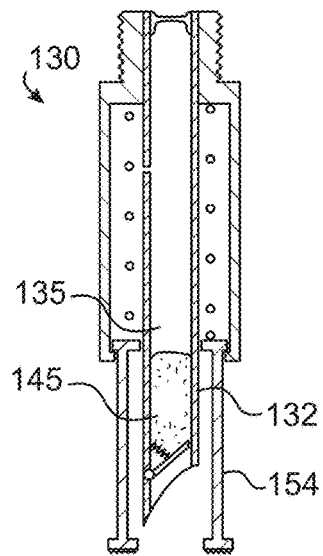
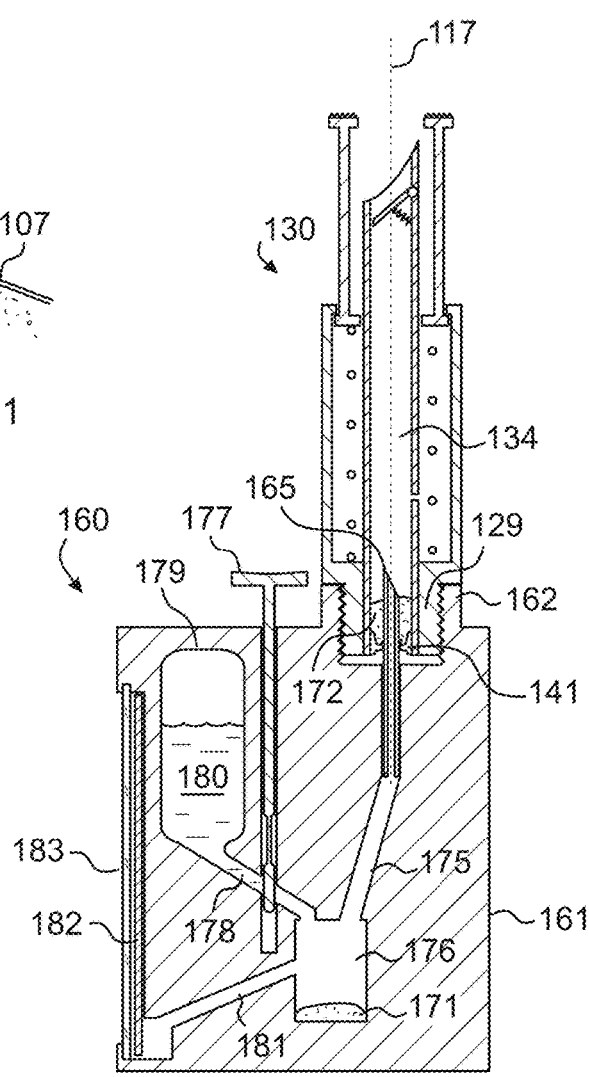
FIG. 11
FIG. 12
FIG. 13

SAMPLE COLLECTOR FOR PARTICULATE MATERIAL AND METHOD

PRIOR APPLICATIONS

This application is a continuation of co-pending U.S. patent application Ser. No. 17/006,855, filed 2020 Aug. 30, to be issued as U.S. patent Ser. No. 11/982,599, on 2024 May 14 which claims the benefit of U.S. provisional patent application Ser. No. 62/894,445, filed 2019 Aug. 30, both of which are incorporated herein by reference.

FIELD OF THE INVENTION

The invention relates to illicit substance interdiction, drug abuse enforcement and more particularly to field screening and sample collecting of materials for the presence of abused drug materials.

BACKGROUND OF THE INVENTION

It is well known that illicit substances used in the manufacture of abused drugs such as heroin, cocaine, methamphetamine, marijuana are transported in bulk form in a clandestine manner to avoid being detected by law enforcement personnel. Such substances or their precursors are in the form of bulk particulate material such as powders, granules, and compressed dried plant pulp that are packaged in bulk in containers such as bags or sacks. These containers are often tightly sealed with tape or other hermetic and airtight materials to avoid odors which can be detected by trained animals or other sensing equipment.

Thus, it is often very difficult for even well-trained personnel to determine in the field whether a suspicious bulk item truly comprises illicit materials or not.

In the past, law enforcement personnel must undertake the often costly, time-consuming task of opening the well-sealed container to sample the material contained therein. Such opening often occurs by puncturing or cutting through the outside surfaces of the container using a knife, or other sharp object, destroying the seal of the container. If the material is not illicit, then law abiding suspects are subjected to costly, time-consuming search activity. Manipulating sharp objects such as knives, razors, or box-cutters can lead to accidental cutting injuries.

Another problem is that some illicit materials such as fentanyl or other powerful opioid drugs can be dangerous when exposed to the skin or inhaled. Thus law enforcement personnel must be well-trained and take costly, time-consuming precautions in order to avoid such exposure. Even then, accidental exposures can and do occur. Materials such as opioid drugs are often transported as fine powders which readily become airborne, posing a significant inhalation risk. Other materials such as opioids can pose even greater risk if there is contact through an open wound such as can readily occur when manipulating sharp objects to open a suspicious, well-sealed container.

Another potential problem is keeping clear identification and chain of custody information associated with samples taken and stored for evidentiary purposes.

Therefore, there is a need for an apparatus which addresses one or more of the above identified inadequacies.

SUMMARY

The principal and secondary objects of the invention are to provide an improved sample collector for particulate material. These and other objects are achieved by providing a disposable, sharpened collection probe for penetrating through a container wall and extracting a portion of particulate material to be preliminarily screened.

In some embodiments a portion of extracted particulate material is preserved for later confirmatory testing.

In some embodiments there is provided a hand held apparatus for collecting an amount of particulate material from an enclosed container, said apparatus comprises: a body; a needle extending distally from said body along an axis, said needle having a sharpened distal tip; a chamber in physical communication with said needle, said chamber being dimensioned to contain said amount of particulate material; a protective sheath movable between an extended position and a retracted position; said sheath comprising: a distal end extending beyond said distal tip when said sheath is in said extended position and exposing said distal tip when said sheath is in said retracted position.

In some embodiments said protective sheath is continually biased toward said extended position.

In some embodiments said body comprises a proximal hand grip and a distal cross-guard extending radially from said body beyond the radial extent of said hand grip.

In some embodiments said sheath comprises a distal orifice dimensioned to allow free passage of said needle therethrough.

In some embodiments said sheath further comprises a distal landing surrounding said orifice, wherein said distal landing has a friction-increasing surface treatment.

In some embodiments said distal landing extends radially inwardly and outwardly from a sidewall of said sheath.

In some embodiments said chamber is formed by a receptacle set into a part of an outer surface of said needle.

In some embodiments said receptacle comprises said outer surface having a texture creating a plurality of sites for trapping a plurality of particles of said amount; and wherein said texture comprises knurling having a coarseness sufficient to form said sites.

In some embodiments said chamber comprises an hermetic enclosure located on said body, wherein said chamber includes a preliminary screening structure for indicating the presence of a target substance in said amount of particular material.

In some embodiments said apparatus further comprises: an amount of liquid reagent; a vacuum region; a frangible barrier sealing said chamber; and, at least one chromatographic test strip sensitive to said target substance.

In some embodiments said needle further comprises: an axial lumen having a distal opening at said tip, and a proximal opening; a pintle located at said proximal opening; and, said pintle being oriented to penetrate said barrier upon proximal axial movement of said needle.

In some embodiments said needle comprises a medial flange bearing against said sheath to cause said proximal axial movement of said needle.

In some embodiments said sheath and said needle are mounted upon a removable cartridge secured to said body.

In some embodiments said needle comprises a distal gate which can move between an open position allowing material to pass through said gate, and a closed position substantially preventing material from passing through said gate.

In some embodiments said needle comprises at least one medial vent extending between said lumen and an outer surface of said needle, said vent being located and dimensioned to ease overpressure in said lumen while particulate material enters said lumen.

In some embodiments said apparatus further comprises: an axial lumen extending through said needle; and, an ejector mechanism for ejecting said portion of said amount from said chamber.

In some embodiments said ejector mechanism comprises: a plunger having a distal rod coaxially engaging said lumen; said plunger being moveable between an axially proximal location and an axially distal location; wherein a section of said lumen is unoccupied by said rod when said plunger is in said proximal location and said section of said lumen is occupied by said rod when said plunger is in said distal location.

In some embodiments said ejector mechanism comprises: an axially moveable plug intimately secured within said lumen.

In some embodiments said plug is held in place within said lumen by a static friction force overcomable by axial movement of said rod under a sufficient force.

In some embodiments said apparatus further comprises: a testing station which comprises: a vessel for accepting a first portion of said amount; and, a preliminary screening device.

In some embodiments said testing station further comprises: a preservation structure for storing a second portion of said amount for later analyses.

In some embodiments said needle has a polygonal cross-section taken substantially perpendicular to said axis.

In some embodiments there is provided a method for conducting a preliminary screening of bulk particulate material contained within a sealed container for the presence of a substance of interest, said method comprises: puncturing said container with a collector apparatus including a sheath covering a needle; wherein said puncturing comprises; automatically progressively retracting said sheath from said needle during said puncturing; capturing an amount of said material contacting said needle; conducting a preliminary screening test adapted to detect said substance on a first portion of said amount; and, obtaining a result of said conducting.

In some embodiments said method further comprises: preserving a second portion of said amount; transporting said second portion to a lab; and, conducting a confirmatory test on said second portion at said lab.

In some embodiments said capturing comprises: forcing said amount into an axial lumen of said needle.

In some embodiments said capturing comprises: withdrawing said apparatus from said container; and, wherein said withdrawing comprises; automatically progressively extending said sheath over said needle during said withdrawing.

The original text of the original claims is incorporated herein by reference as describing features in some embodiments.

BRIEF DESCRIPTION OF THE DRAWINGS

FIG. 9 is a diagrammatic cross-sectional side view of a dry particulate material collection device having an on-board testing mechanism according to an alternate exemplary embodiment of the invention.

FIG. 10 is a diagrammatic cross-sectional side view of a dry particulate material collection device having a removable, replaceable and disposable collection cartridge according to an alternate exemplary embodiment of the invention.

FIG. 11 is a diagrammatic cross-sectional side view of the collection device of FIG. 10 having its protective sheath in its retracted position while engaging a suspicious container.

FIG. 12 is a diagrammatic cross-sectional side view of the removed collector cartridge after having collected a sample of suspicious material.

FIG. 13 is a diagrammatic cross-sectional side view of the collector cartridge engaged by a testing station.

DESCRIPTION OF THE EXEMPLARY EMBODIMENTS

Figure 1:
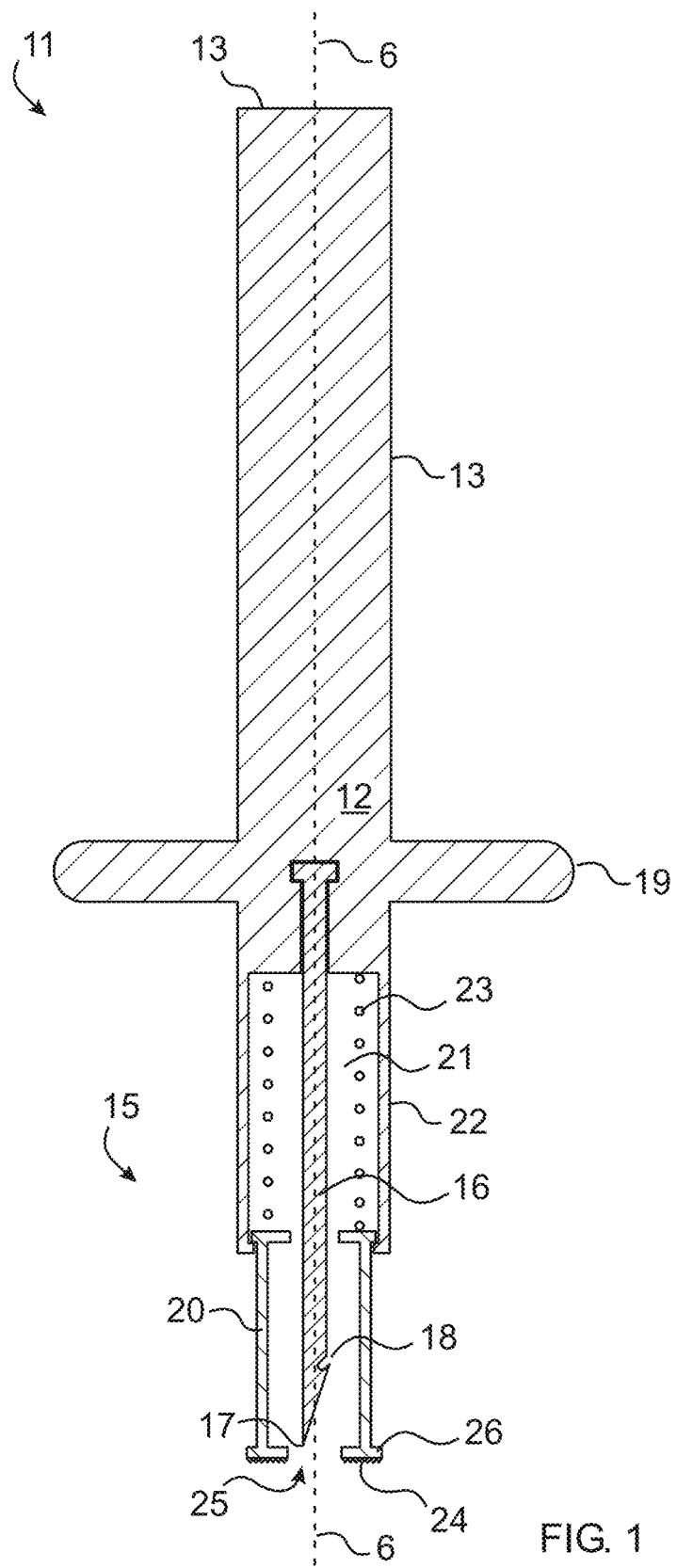
FIG. 1 is a diagrammatic cross-sectional side view of a dry particulate material collection device according to an exemplary embodiment of the invention.

In this specification, the references to top, bottom, upward, downward, upper, lower, vertical, horizontal, sideways, lateral, back, front, proximal, distal, etc. can be used to provide a clear frame of reference for the various structures with respect to other structures while the collector is as shown in FIG. 1, and not treated as absolutes when the frame of reference is changed, such as when the collector is inverted or disassembled.

The term "substantially" can be used in this specification because manufacturing imprecision and inaccuracies can lead to non-symmetricity and other inexactitudes in the shape, dimensioning and orientation of various structures. Further, use of "substantially" in connection with certain geometrical shapes and orientations, such as "parallel" and "perpendicular", can be given as a guide to generally describe the function of various structures, and to allow for slight departures from exact mathematical geometrical shapes and orientations, while providing adequately similar function. Those skilled in the art will readily appreciate the degree to which a departure can be made from the mathematically exact geometrical references.

The word "axial" is meant to refer to directions, movement, or forces acting substantially parallel with or along a respective axis, and not to refer to rotational nor radial nor angular directions, movement or forces, nor torsional forces.

Referring now to the drawing, there is shown in FIGS. 1-7, according to a present embodiment of the invention, a sample collector device 11 for collecting an amount of particulate material from an enclosed container such as a sealed bag. The device includes a body 12 elongated along an axis 6 having a proximal handle 13 which can be grasped by the user, and an opposite distal trapping mechanism 15 for penetrating the wall of the container and extracting the amount of particulate material. A cross-guard 19 located distal to the handle extends substantially perpendicularly to the elongation axis to protect the user's hand during use. The trapping mechanism can include a collection probe such as a needle 16 extending along an axis of penetration which can be coaxial to the elongation axis 6. The needle can made from steel or another strong, durable, and hard material. The needle can have a sharpened distal tip 17 that is capable of puncturing the wall of the container when provided a reasonable amount of axial force, such as can be delivered easily by a human hand. A substantially cylindrical steel needle having a diameter of between about 3 and 5 millimeter can be adequate. The collector can include a chamber 18 for trapping an amount of collected material. In this embodiment the chamber can be formed by a receptacle extending inwardly from an outer surface of the needle 16 near its distal tip. The receptacle can have a scoop shape that opens toward the proximal end of the collector so that material is trapped by the scoop during the withdrawal of the needle from the sampled container. In this way the chamber is in physical communication with the needle.

The trapping mechanism 15 can include a substantially cylindrical retractable sheath 20 which, in its extended position (as shown in FIG. 1) covers over the needle tip 17 thereby protecting against harmful inadvertent contact with the sharp point of the needle. The sheath can retract axially into a substantially cylindrical well 21 formed by the interior of a substantially cylindrical housing 22 when the sheath is in its retracted position (shown in FIG. 4). A slip-resistant resilient pad 24 or other friction-increasing surface treatment such as grooves or asperities can be formed onto the distal landing 26 of the sheath surrounding the distal orifice 25 through which the needle freely passes during movement of the sheath. The pad provides an increase in frictional contact with the surface of the container being sampled which helps ensure axial movement of the needle without slippage and without lateral force components which tend to break or bend the needle. The landing can be disk-shaped to extend radially inwardly and outwardly beyond the substantially cylindrical sidewalls 27 of the sheath in order to help strengthen and rigidize the sheath, especially at its distal end. The sheath can be made from a solid piece of material to prevent sample particles from passing through its sidewalls.

The sheath 20 can be continually biased toward the extended position by a biasing member in the form of a spring 23, meaning it is biased in all positions between the fully retracted and fully extended positions so that the sheath may progressively retract and extend in response to the force applied axially to its distal end, thus allowing the distal landing of the sheath to remain in contact with the container being sampled, and enclosing the site of puncturing during the capturing of the sample, and reducing the chance that particles of the material become airborne.

Figure 2:
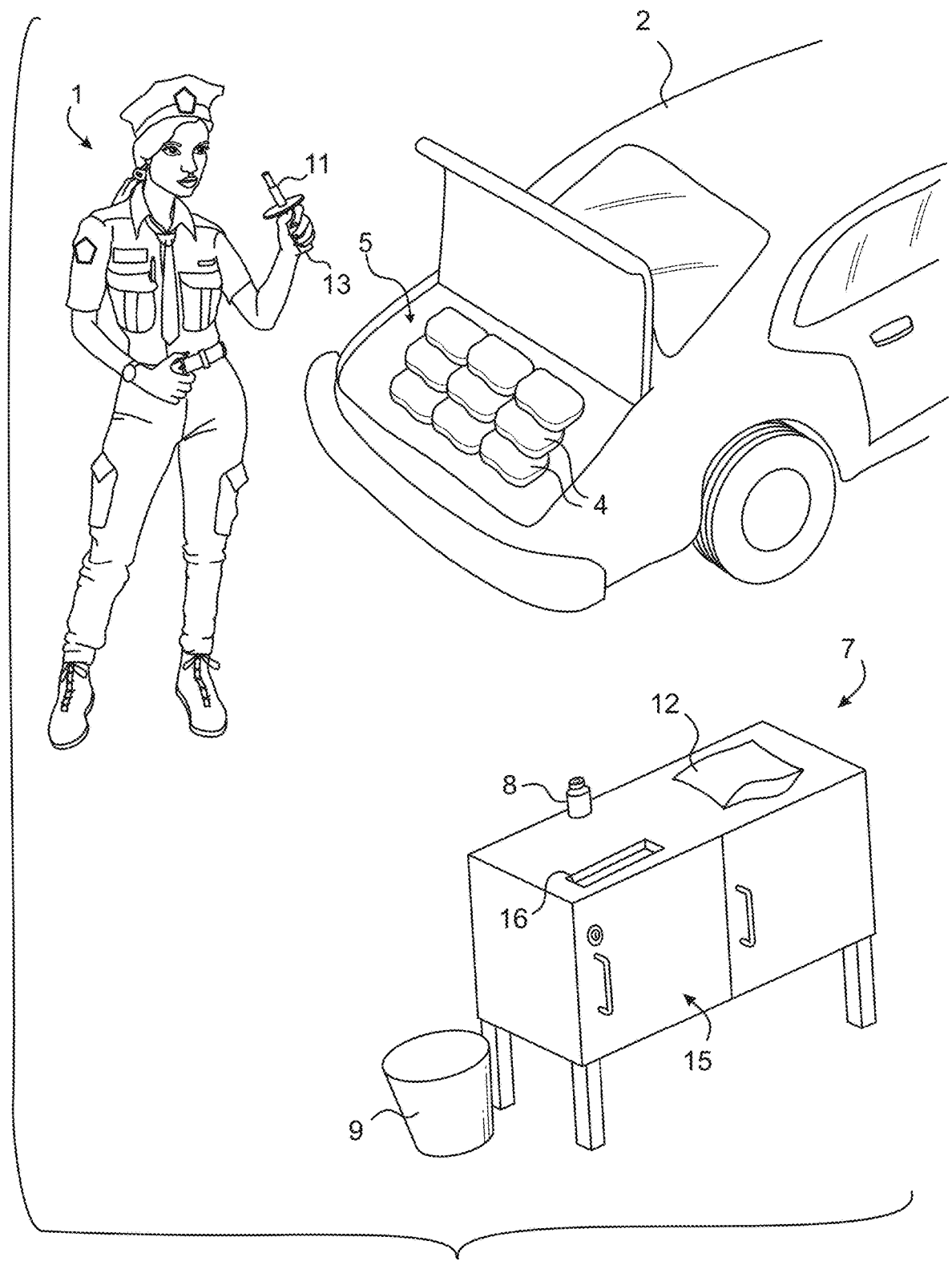
FIG. 2 is a diagrammatic perspective view of a law enforcement officer performing an inspection according to an exemplary embodiment of the invention.

As shown in FIG. 2, a law enforcement inspector 1 can perform a detailed secondary inspection of a suspect vehicle 2 at a border inspection area. The inspector has detected a number of suspicious containers 4, in the trunk 5 of the vehicle and has decided to sample the contents of one of the containers. Rather than handling the potentially dangerous containers, the inspector further decides to obtain a sample from one of the containers as it rests in situ. The officer grasps a sample collector device 11 as described above and approaches a target container. The inspector can stab the collector against one of the suspicious containers while it rests in situ, in other words, in absence of moving the container from where it rests in the subject vehicle, and without otherwise touching or handling the container. The inspector can then immediately withdraw the collector from the container so that by using a simple stabbing and withdrawing motion, the inspector safely collects the sample.

After collecting the sample using the collector 11, the inspector 1 can then conduct a preliminary screening process at a preliminary screening station 7 located in the inspection area. The station can include a preliminary screening tester 8 into which the collected sample may be deposited. The tester can include a vessel containing a liquid reagent that is chromatically responsive to substances which may indicate the presence of a particular illicit substance. Various testers can be provided having number of reagents and a panel of chromatographic-style test strips adapted to detect one or more of the target illicit substances.

If the result of the preliminary screening test is negative, meaning no illicit substances have been detected in the sample, the collector and tester can be discarded into a waste collection bin 9. If, on the other hand, the result of the preliminary screening test is positive, meaning one or more illicit substances have been detected in the sample, the inspector 1 can preserve the collector and tester by placing them into a sealable, tamper-proof evidence storage bag 12, which can be deposited through a top slot 16 into a locked storage compartment 15 for later recovery and transport to an evidence storage facility. Each collector can easily be uniquely marked by serial number or other indication to further identify a particular collector from others.

Figure 3:
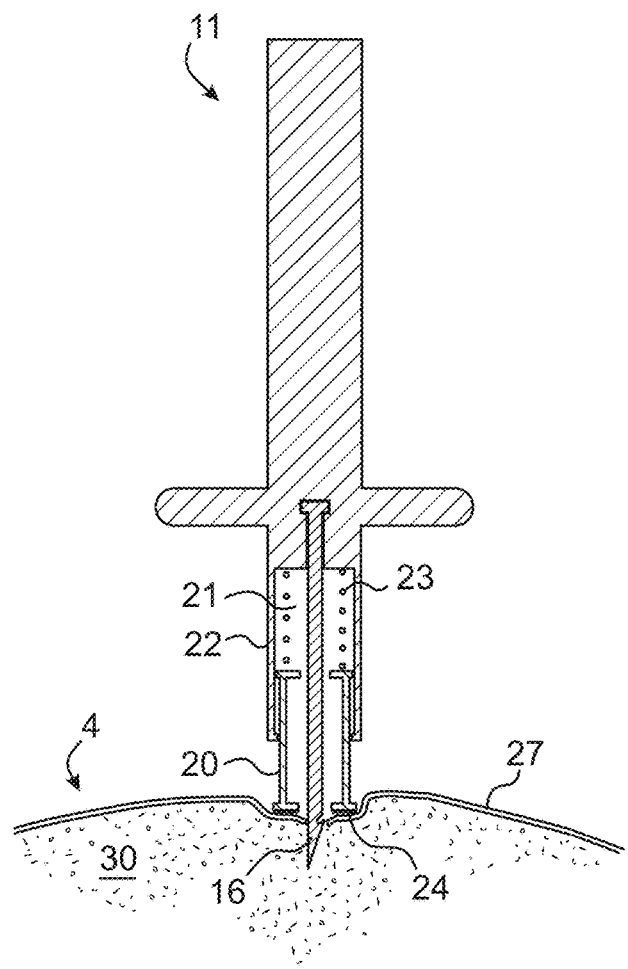
FIG. 3 is a diagrammatic cross-sectional side view of the collection device puncturing the outer wall of a suspicious container.

As shown in FIG. 3, the stabbing action causes the pad 24 on the distal extremity of the sheath 20 to contact the outer surface of the outer wall 27 of the container 4, and the sheath to be driven to retract automatically and progressively into the well 21 of the housing 22 of the collector device 11 while the needle 16 plunges through the outer wall and into the contents 30 of the container. Due to the spring 23 which biases the sheath toward its extended position, the sheath retracts only as far as is necessary to accommodate the needle simultaneously plunging axially further into the container.

Figure 4:
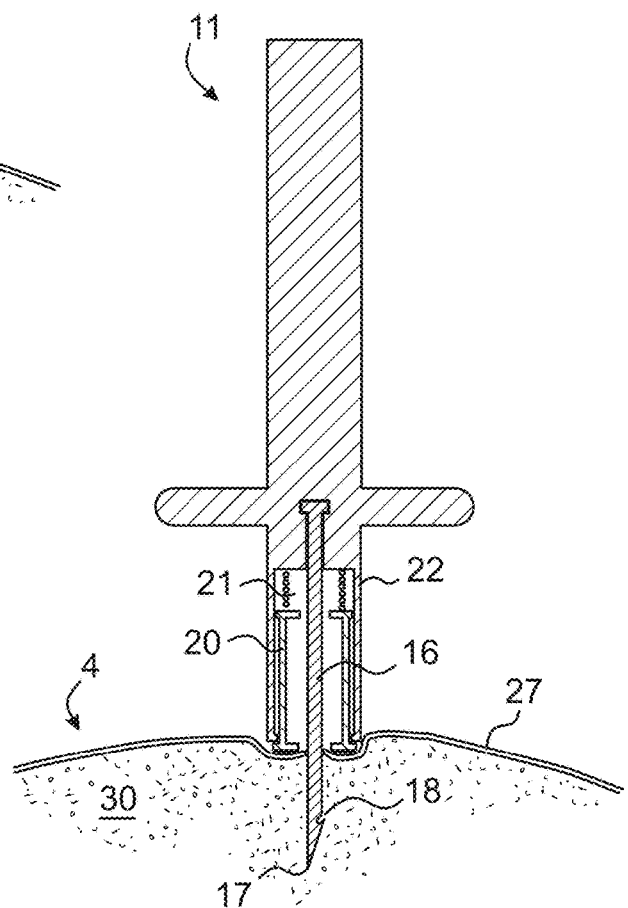
FIG. 4 is a diagrammatic cross-sectional side view of the collection device having its protective sheath in its retracted position while engaging a suspicious container.

As shown in FIG. 4, at the termination of the stabbing motion the sheath 20 is typically fully retracted into the well 21 of the housing 22 of the collector device 11 while the needle 16 deeply extends into the interior and contents 30 of the container 4.

After the stabbing motion the collector device 11 can be withdrawn from the container 4 using a motion in the opposite direction to the stabbing motion, in other words moving the device axially away from the container. Axial movement helps prevent the needle from being bent or broken off. The weight of the contents and the withdrawal of the needle forces an amount of the contents, now characterized as the sample, into the chamber 18. Further, while the collector is being withdrawn, the biasing spring 23 causes the sheath 20 to automatically and progressively return to its extended position covering the tip 17 of the needle 16, protecting the extracted sample in the chamber 18 from loss or contamination, and protecting against human contact with the potentially tainted needle point. The progressive nature of the return motion maintains contact between the sheath and the container outer wall 27 until the tip of the needle clears the site of the puncture and is completely recovered by the sheath.

Figure 5:
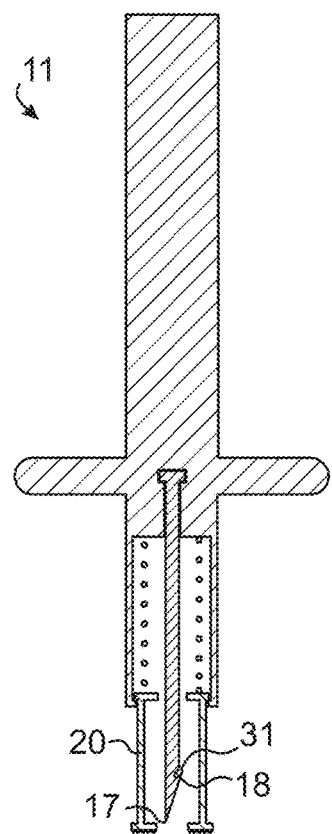
FIG. 5 is a diagrammatic cross-sectional side view of the collection device after having collected a sample of suspicious material.

FIG. 5 shows the collector device 11 fully withdrawn from the container with the sheath 20 in its fully extended position covering the needle tip 17, and with the sample 31 carried in the receptacle chamber 18 on the needle 16. When the device has been completely withdrawn from the container, the sheath has automatically returned to its fully extended position to both protect the extracted sample from loss or contamination, and to protect against human contact with the potentially tainted needle point. Further, in this way, the sheath can stay in contact with the container outer wall during the entire collection process, from prior to the needle puncturing the container until the tip of the needle is safety covered again and the sample is on board the collector. By enclosing the site of penetration during collection, the sheath prevents a blow-back of material from being dispersed into the air by the stabbing action, thus protecting the user from inhalation of harmful material.

Figure 6:
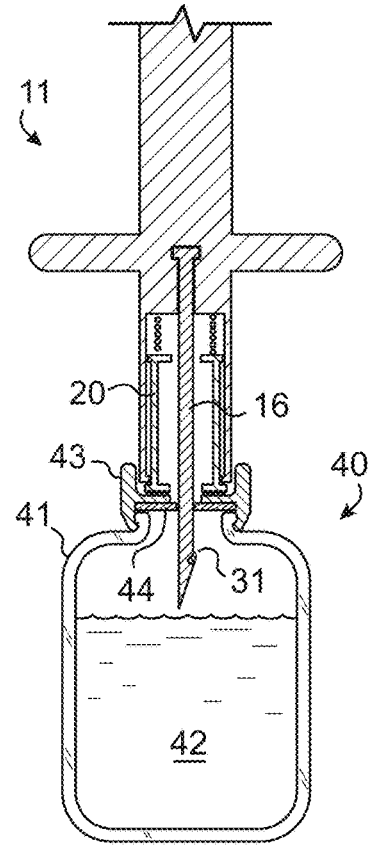
FIG. 6 is a diagrammatic cross-sectional side view of the collection device puncturing a testing vessel.

As shown in FIG. 6, the collected sample 31 can be immediately preliminarily screened by inserting the needle tip into a tester 40 such as a vessel 41 containing an amount of liquid reagent 42 chromatically reactive to one or more of the target illicit substances. The vessel can have a cap 43 having a puncturable seal 44 so that the user merely aligns the sheath 20 with the cap and pushes the collector axially toward the tester in much the same manner as the stabbing motion used to capture the sample from the suspicious container. This motion can cause the sheath to retract automatically and progressively as the needle 16 penetrates the puncturable seal.

Figure 7:
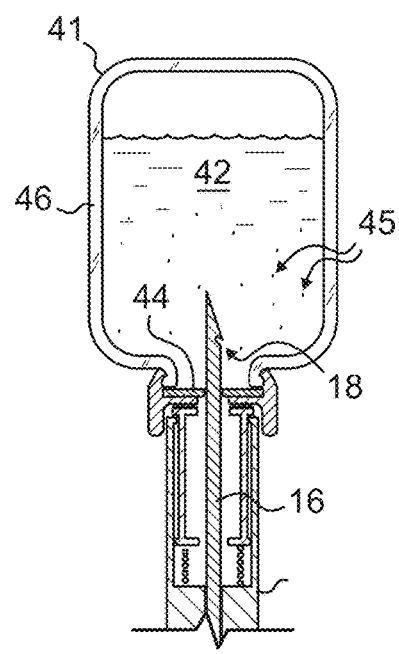
FIG. 7 is a diagrammatic cross-sectional side view of the collection device and testing vessel in an inverted orientation to bring the sample into contact with reagent.

FIG. 7 shows that once the needle 16 has punctured the seal 44, the vessel 41 can be inverted to allow the reagent 42 to come into contact with the chamber 18 carrying the sample if it has not already done so, and to help disperse the sample 45 in the reagent. If necessary, the user can easily slightly agitate the vessel to enhance mixing. After a short time the reagent may change color by reacting with the sample which can be observed by the user through the substantially transparent sidewalls 46 of the vessel. Depending on the result, the collector can either be discarded or stored.

Figure 8:
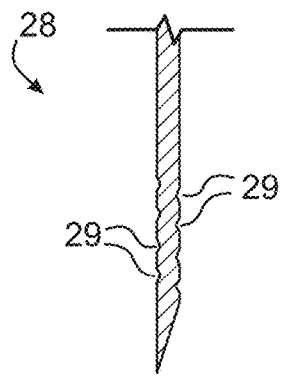
FIG. 8 is a diagrammatic cross-sectional side view of a needle according to an alternate embodiment having specimen-trapping knurling on its outer surface.

FIG. 8 shows an alternate needle 28 wherein the chamber 29 can be formed by a number of surface indentations, such as through knurling or other texturing on an outer surface of the needle.

Referring now to FIG. 9, there is shown an alternate embodiment of a hand-held collector 50 for extracting a portion of particulate material from an enclosed container for preliminary screening purposes. In this embodiment the collector provides an on-board preliminary screening mechanism.

Similar to the previous embodiment, the collector 50 can include a body elongated along an axis 56, having a proximal handle 51, a medial cross-guard 52, and supporting a distal trapping mechanism 53 that can include a sheath 54 which retracts into the internal well 55 of a housing 57, where the sheath is continuously biased toward an extended position in which the sheath covers the tip 58 of a needle 59 acting as a collection probe.

In this embodiment however the chamber 70 for trapping an amount of collected material can be formed in the handle portion 51 of the body of the collector 50. The chamber can be formed by an enclosure containing an amount of liquid reagent 71 and a vacuum region 72 containing a low pressure gas such as nitrogen which is substantially non-reactive with the reagent. Therefore, the walls of the chamber must be structurally rigid, non-collapsible, and hermetic to maintain the vacuum during the shelf life of the collector.

A frangible barrier 73 made of a hermetic material such as plastic, plastic backed foil, or rubber can extend across and hermetically seal a distal terminus of the chamber. The barrier must be strong enough to withstand the vacuum and movement of reagent during use. The chamber also includes one or more pockets 74 for carrying one or more chromatographic test strips 75 which can detect the presence of various compounds or biological markers in a liquid. The ends 76 of the strips can be exposed to the chamber apart from the vacuum region. An axially movable plug 81 is held in place by the vacuum region to protect the strips ends from contacting liquid reagent until the barrier has been broken and the vacuum dissipated. The strips can be viewed through transparent windows 77 on the outer wall of the handle 51 adjacent to the pockets.

The needle 59 can have a central axial lumen 60 running between a distal opening 61 and a proximal opening 62. A flange 64 can extend radially from a medial part of the needle to bear against a surface 82 of the sheath 54 as the sheath is driven to retract during the stabbing motion. The flange is located axially medially so that it is engaged by the sheath after the needle tip is already exposed, pierced the outer wall of the target container, and the distal opening of the needle is fully immersed in the contents of the container. The proximal end of the needle can include a sharpened pintle 63 oriented to puncture the barrier 73 when the needle is driven upwards toward the internal chamber 70. Once punctured the chamber is in physical communication with the needle.

In this way, during the stabbing motion, the distal end of the sheath 54 first contacts the outer wall of the container being tested. Then, as the collector 50 moves further toward the container, the sheath is driven axially proximally until the distal tip 58 of the needle 59 penetrates the outer wall. Eventually the entire distal opening 61 of the lumen 60 of the needle is immersed into the contents of the container. Further movement causes the proximal surface 82 of the sheath to bear against the flange 64 and drive the needle proximally until its pintle 63 penetrates through the frangible barrier 73 sealing the chamber 70. The vacuum in the chamber causes an amount of material to be sucked from the contents of the container, through the lumen of the needle and into the chamber 70 where it mixes with the reagent 71. The user then withdraws the collector from the container and inverts the orientation of the collector so that gravity draws the reagent toward the proximal end of the chamber where the weight of the reagent dislodges the plug 81, allowing reagent to flow onto the proximal ends 76 of the test strips 75. The user can then view the results on the strips through the viewing windows 77 and either discard the collector or save it as evidence.

Referring now to FIGS. 10-13, there is shown an alternate exemplary embodiment of a hand-held collector 100 for extracting a portion of particulate material from an enclosed container for preliminary screening and preservation of a second portion of the same sample, unexposed to testing reagents for potentially more rigorous testing or other evidentiary purposes. In this embodiment, the collector includes a removable, replaceable and disposable collection cartridge 130 securable to the distal end 125 of a collector body 121 which can be non-disposable and thus be constructed more elaborately. The collector can include a substantially cylindrical, oblong proximal handle portion 122 having an outer resilient material hand grip 123. A protective hand guard 126 can extend radially from a medial section of the body located distally from the hand grip.

The collection cartridge 130 can include a hollow substantially cylindrical housing 131 which can releasably secure to the body 121 by a threaded proximal extremity 129 engaging a cooperatively threaded receiver 127 formed onto the distal end 125 of the body. The housing supports a collection probe in the form of a substantially cylindrical, coaxial, oblong, hollow needle 132 and an internal axial lumen 134 having a distal opening 136 at the sharpened distal tip 133. The needle can be coaxial with the axis 117 of penetration of the collector so that the needle is not subjected to significant off-axis forces during use.

The needle 132 can include a unidirectional gate valve 137 located near the distal tip 133 to allow particulate material to flow proximally into the lumen 134 from the distal opening 136 and prevent particular material from flowing distally past the valve and out of the lumen. In this way the a portion of the lumen forms a chamber 135 in physical communication with the needle for trapping an amount of collected material. The valve can mount to the needle at a hinge 138 and be biased by a spring 139 toward a valve closed position. The bias can of course be overcome by the force of material flowing into the lumen past the valve.

Referring now primarily to FIG. 11, similar to the prior embodiments, the stabbing motion causes the friction enhanced pad 156 at the distal end of the sheath 154 to first contact the outer wall 107 of the container 104 being tested. Then, as the collector moves further toward the container, the sheath is driven axially proximally until the distal tip 133 of the needle 132 penetrates the outer wall. Eventually, as the needle is driven further into the contents 103 of the container, an amount of the contents is forced through the distal opening and against the distal surface of the gate valve 137 overcoming the biasing spring to open the valve and allow an amount of contents to pass into the chamber 135. A pressure relief port 140 through the sidewall of the needle prevents pressure from building up within the lumen due to the influx of material into the chamber. A penetratable plug 141 seals the proximal end of the lumen. During withdrawal the force on the gate valve in the proximal direction is removed, allowing the gate valve to close, trapping the amount 145 of contents in the chamber as shown in FIG. 12.

FIG. 12 shows the collection cartridge 130 separated from the body of the collector. It is important to note that the sheath 154 has returned to its extended position preventing inadvertent contact with the needle 132 and the amount 145 of collected material trapped in its chamber 135.

FIG. 13 shows that the cartridge can be inserted onto a test station 160 which extracts the amount of collected material from the cartridge 130, provide a preliminary screening result using a first portion 171 of the sample, and preserves a second portion 172 of the sample for later confirmatory testing in a lab.

Specifically, the test station 160 can include a housing 161 having a threaded receiver 162 on an upper surface for mounting the correspondingly threaded proximal extremity 129 of the cartridge 130. During mounting, a hollow spike 165 extending upwardly and coaxially with the central axis 117 of the cartridge pierces the plug 141 sealing the end of the lumen 134 and allows a first portion 171 of the amount of material to exit the cartridge and flow down a first chute 175 and into a mixing alcove 176. A second portion 172 remains in the cartridge and is thus preserved for later use.

A preliminary screening can be initiated by depressing a button 177 on the housing 161 of the test station 160 which opens a second chute 178 allowing a hopper 179 containing an amount of reagent 180 to drain into the mixing alcove 176 and mix with the first portion 171 of the sample material. The mixture of reagent and sample can then flow down a third chute 181 and onto the end of one or more chromatographic test strips 182 whose results can be viewed through a transparent viewing window 183.

It shall be understood that the cartridge 130 and the body 121 of the collector 100 provide surfaces that can readily accept attachment of a unique identifier such as a serial number imprinted on the tag. The tag can include, but is not limited to, information including the date and time the sample was collected, the location such as global positioning system (GPS) coordinates, identification of the inspector who performed the collection, atmospheric conditions and the like. The information can be stored in a database associating the information with the particular cartridge. Alternately, a radio frequency identification (RFID) tag can be attached to the cartridge. The collector body can include a radio frequency interrogator which unambiguously uploads the information into the RFID tag at the time the sample is collected.

Figure 14:
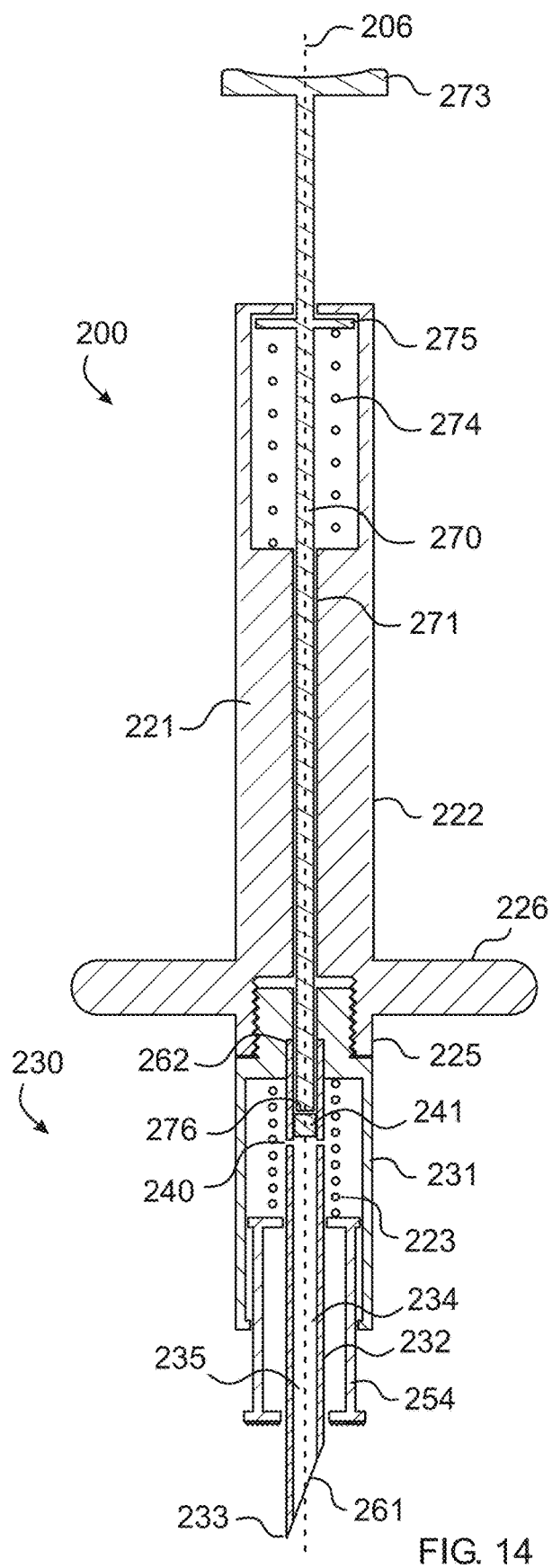
FIG. 14 is a diagrammatic cross-sectional side view of a dry particulate material collection device having a sample dispensing plunger according to an alternate exemplary embodiment of the invention.

Referring now to FIG. 14, there is shown an alternate exemplary embodiment of a hand-held collector 200 for extracting a portion of particulate material from an enclosed container and dispensing it while protecting the inspector from contacting the potentially harmful contents of the container. In this embodiment frictional compaction of the particles of the sample within the lumen allow the sample to be collected there until ejected.

Similar to the previous embodiment, the collector 200 can include an oblong body 221, a removable, replaceable and disposable collection cartridge 230 securable to the distal end 225 of the body which can be non-disposable and thus be constructed more elaborately. The collector can include a substantially cylindrical, oblong proximal handle portion 222 and a protective hand guard 226 can extend radially from a medial section of the body located distally from the handle.

Similar to the prior embodiment, the cartridge 230 can include a protective sheath 254 retractable along an axis 206 into a housing 231 that fully covers a distal sharpened collector probe needle 232 when the sheath is in its extended position, and exposes the needle in its retracted position. The sheath can be continually biased toward the extended position by a spring 223. The needle can have an axial lumen 234 having a proximal opening 262, a distal opening 261, and a sharpened distal tip 233. A portion of the lumen can for a chamber 235 for collecting the sample of material from the suspicious container. One or more pressure relief ports 240 through the sidewall of the needle prevents pressure from building up within the lumen due to the influx of material into the chamber.

An axially movable plug 241 seals the proximal opening 262 of the lumen 234 from the chamber 235. The plug can be moved axially distally by a plunger 270 having a distal rod coaxially engaging the lumen by way of a coaxial tunnel 271 extending through the body 221 and aligned with the lumen. The plug can intimately engage the lumen and remain in its axial position within the lumen due to static friction until forced distally by the plunger. A pushbutton 273 can be located at the proximal end of the plunger so the inspector can manipulate the plunger. The plunger allows the plug to be moved between an axially proximal location as shown and an axially distal location which forces some or all of the collected sample back out the distal opening 261 of the lumen. In this way, when the plunger is in its axially proximal location a section of the lumen is unoccupied by the rod, and, when the plunger is in its axially distal location a section of the lumen is occupied by the rod. The plunger can be biased to return the proximal location by an internal spring 274. A stopper flange prevents the plunger from escaping proximally. The plug also keeps the distal end 276 of the rod from being contaminated during use. In this way the cartridge is completely isolated from the body while still allowing a mechanical link between the pushbutton and the cartridge.

Alternately, the collector 200 can be used without the plug 241, so that the distal end 276 of the rod of the plunger 270 contacts the sample in the chamber 235 and ejects some or all of it.

Similar to prior embodiments, the cartridge 230 can be replaced after use so that collector can be used again without contaminating the second container being sampled.

Figure 15:
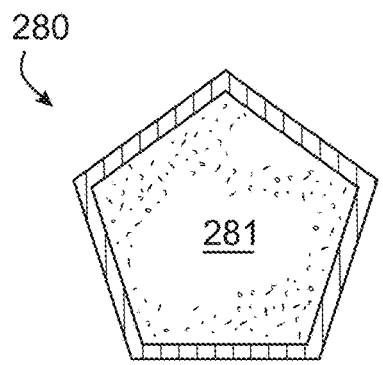
FIG. 15 is a diagrammatic cross-sectional end view of a needle according to an alternate embodiment having a polygonal shape.

FIG. 15 shows an alternate collection probe needle 280 having a lumen which has a polygonal cross-sectional shape. In other words the needle can be provided without having a cylindrical shape to its axial lumen. The non-smooth inner surface creates pressure differences in the collected sample 281 that can enhance static friction and thus better retain the sample within the lumen until it is dispensed.

While the preferred embodiment of the invention has been described, modifications can be made and other embodiments may be devised without departing from the spirit of the invention and the scope of the appended claims.

What is claimed is:

1. A method for detecting the presence of a substance of interest within a sealed container containing bulk particulate material, said method comprises:
   puncturing said container with a collector apparatus including a sheath retractably covering a needle;
   wherein said puncturing comprises;
      automatically progressively retracting said sheath from said needle during said puncturing;
   capturing an amount of said material contacting said needle;
   conducting a screening test adapted to detect said substance on a first portion of said amount; and,
   obtaining a result of said conducting.

2. The method of claim 1, wherein said method further comprises:
   preserving a second portion of said amount;
   transporting said second portion to a lab; and,
   conducting a confirmatory test on said second portion at said lab.

3. The method of claim 1, wherein said capturing comprises:
   forcing said amount into an axial lumen of said needle.

4. The method of claim 1, wherein said capturing comprises:
   withdrawing said apparatus from said container; and,
   wherein said withdrawing comprises;
      automatically progressively extending said sheath over said needle during said withdrawing.

5. The method of claim 1, wherein said method further comprises continually biasing said sheath toward a position covering said needle.

6. The method of claim 1, wherein said method further comprises:
   holding said collector apparatus in the hand of a user; and,
   protecting said user's hand during said puncturing.

7. The method of claim 6, wherein said holding comprises:
   said user grasping a proximal hand grip on said collector apparatus; and,
   wherein said protecting comprises:
      extending a distal cross-guard radially from said collector apparatus beyond the radial extent of said proximal hand grip.

8. The method of claim 1, wherein said method further comprises passing said needle through a distal orifice in said sheath.

9. The method of claim 8, wherein said puncturing further comprises contacting an increased friction surface on a distal landing surrounding said orifice against said container.

10. The method of claim 9, wherein said method further comprises enclosing a site of puncturing with said sheath during said capturing.

11. The method of claim 1, wherein said capturing comprises:
    forming a receptacle set into a part of an outer surface of said needle.

12. The method of claim 11, wherein said forming comprises:
    texturing said part of said outer surface to create a plurality of sites for trapping a plurality of particles of said amount.

13. The method of claim 1, wherein said conducting comprises:
    locating on said collector apparatus a preliminary screening structure for indicating the presence of said substance of interest in said first portion of said amount of said material.

14. The method of claim 13, wherein said conducting further comprises:
    mixing a liquid reagent with said first portion of said amount of said material to create a mixture;
    wherein said reagent is chromatically reactive to said substance of interest.

15. The method of claim 14, wherein said conducting further comprises:
    observing said result in a color of said mixture through a window in said collector apparatus.

16. The method of claim 14, wherein said conducting further comprises:
    flowing an amount of said mixture onto at least one chromatographic test strip sensitive to said substance of interest.

17. The method of claim 1, wherein said conducting comprises:
    removing said needle from said apparatus after said capturing; and,
    exposing said needle to a liquid reagent that is chromatically reactive to said substance of interest.

\* \* \* \* \*